United States Patent
Jindal et al.

(10) Patent No.: US 11,631,204 B2
(45) Date of Patent: *Apr. 18, 2023

(54) GENERATING CANDIDATE MIRROR SNAP POINTS USING DETERMINED AXES OF SYMMETRY

(71) Applicant: Adobe Inc., San Jose, CA (US)

(72) Inventors: Ashish Jindal, Tri Nagar (IN); Kush Pandey, Aligarh (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,415

(22) Filed: Mar. 11, 2022

(65) Prior Publication Data
US 2022/0301242 A1 Sep. 22, 2022

Related U.S. Application Data

(63) Continuation of application No. 17/206,839, filed on Mar. 19, 2021, now Pat. No. 11,321,884.

(51) Int. Cl.
*G06T 11/20* (2006.01)
*G06F 3/04845* (2022.01)
*G06T 3/00* (2006.01)
*G06T 11/60* (2006.01)

(52) U.S. Cl.
CPC ........ *G06T 11/203* (2013.01); *G06F 3/04845* (2013.01); *G06T 3/0075* (2013.01); *G06T 11/60* (2013.01)

(58) Field of Classification Search
None
See application file for complete search history.

(56) References Cited

U.S. PATENT DOCUMENTS

| 6,111,588 A * | 8/2000 | Newell ................... G06T 11/20 345/441 |
| 6,228,542 B1 | 5/2001 | Kamon |
| 7,535,460 B2 | 5/2009 | Momose |
| 10,216,389 B2 | 2/2019 | Jaramillo et al. |
| 11,062,493 B1 * | 7/2021 | Agrawal ................. G06T 11/60 |
| 11,321,884 B1 | 5/2022 | Jindal et al. |
| 2007/0211944 A1 | 9/2007 | Takeguchi et al. |
| 2019/0244403 A1 * | 8/2019 | Shaw ...................... G06T 11/60 |

OTHER PUBLICATIONS

"Non-Final Office Action", U.S. Appl. No. 17/206,839, filed Sep. 28, 2021, 8 pages.
"Notice of Allowance", U.S. Appl. No. 17/206,839, filed Dec. 30, 2021, 5 pages.

* cited by examiner

*Primary Examiner* — Jeffrey J Chow
(74) *Attorney, Agent, or Firm* — FIG. 1 Patents

(57) ABSTRACT

In implementations of systems for generating candidate mirror snap points using determined axes of symmetry, a computing device implements a symmetry system to receive vector object data describing a set of points of a vector object. The symmetry system generates convex polygons that enclose the set of points and identifies a particular convex polygon that has a smallest area. A side of the particular convex polygon is determined as an axis of symmetry for the vector object. The symmetry system generates an indication for display in a user interface of a candidate snap point based on the axis of symmetry and a point of the set of points of the vector object.

20 Claims, 11 Drawing Sheets

GENERATING CANDIDATE MIRROR SNAP POINTS USING DETERMINED AXES OF SYMMETRY

RELATED APPLICATION

This application is a continuation of and claims priority to U.S. patent application Ser. No. 17/206,839, filed Mar. 19, 2021, entitled "Generating Candidate Mirror Snap Points Using Determined Axes of Symmetry," the entire disclosure of which is hereby incorporated by reference herein in its entirety.

BACKGROUND

In the context of creating and editing digital content, mirror snapping systems identify and suggest candidate snap points for creating new path segments by reflecting points of existing path segments relative to axes of symmetry. For example, a user interacts with an input device such as a mouse or stylus using an application for creating and editing digital content to draw the existing path segments on one side of an axis of symmetry in a user interface. A mirror snapping system renders indications of candidate snap points on the other side of the axis of symmetry in the user interface. These candidate snap points are symmetric to the points of the existing path segments relative to the axis of symmetry. The user interacts with the input device to connect the points of the existing path segments to the candidate snap points to create a symmetric vector object.

However, conventional mirror snapping systems are limited to pre-defined axes of symmetry such as a horizontal axis and/or a vertical axis. Due to this limitation, conventional systems are of minimal value in scenarios in which the existing path segments define a vector object that is oriented at an angle or which is partially asymmetric. For example, if the vector object is oriented at an angle relative to the pre-defined axis of symmetry, then the object must first be manually reoriented to align with the horizontal or vertical axis. The reoriented vector object is modified using the candidate snap points, and then manually reoriented again to align with the angle which is error prone and inefficient.

SUMMARY

Techniques and systems are described for generating candidate mirror snap points using determined axes of symmetry. In an example, a computing device implements a symmetry system to receive vector object data describing a set of points of a vector object. The symmetry system generates convex polygons that enclose the set of points. In one example, the convex polygons are rectangles. The symmetry system identifies a particular convex polygon that has the smallest area, for example, each of the convex polygons has an area and the particular convex polygon has the smallest area.

The symmetry system determines an axis of symmetry for the vector object as a side of the particular convex polygon. For example, the side is a longest side of the particular convex polygon, the side is a closest side of the particular convex polygon to the most recent indication of a user interaction, etc. The symmetry system generates an indication of a candidate snap point for display in a user interface based on the determined axis of symmetry and a point of the set of points of the vector object. In an example, the indication of the candidate snap point is generated by reflecting the point about the determined axis of symmetry.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
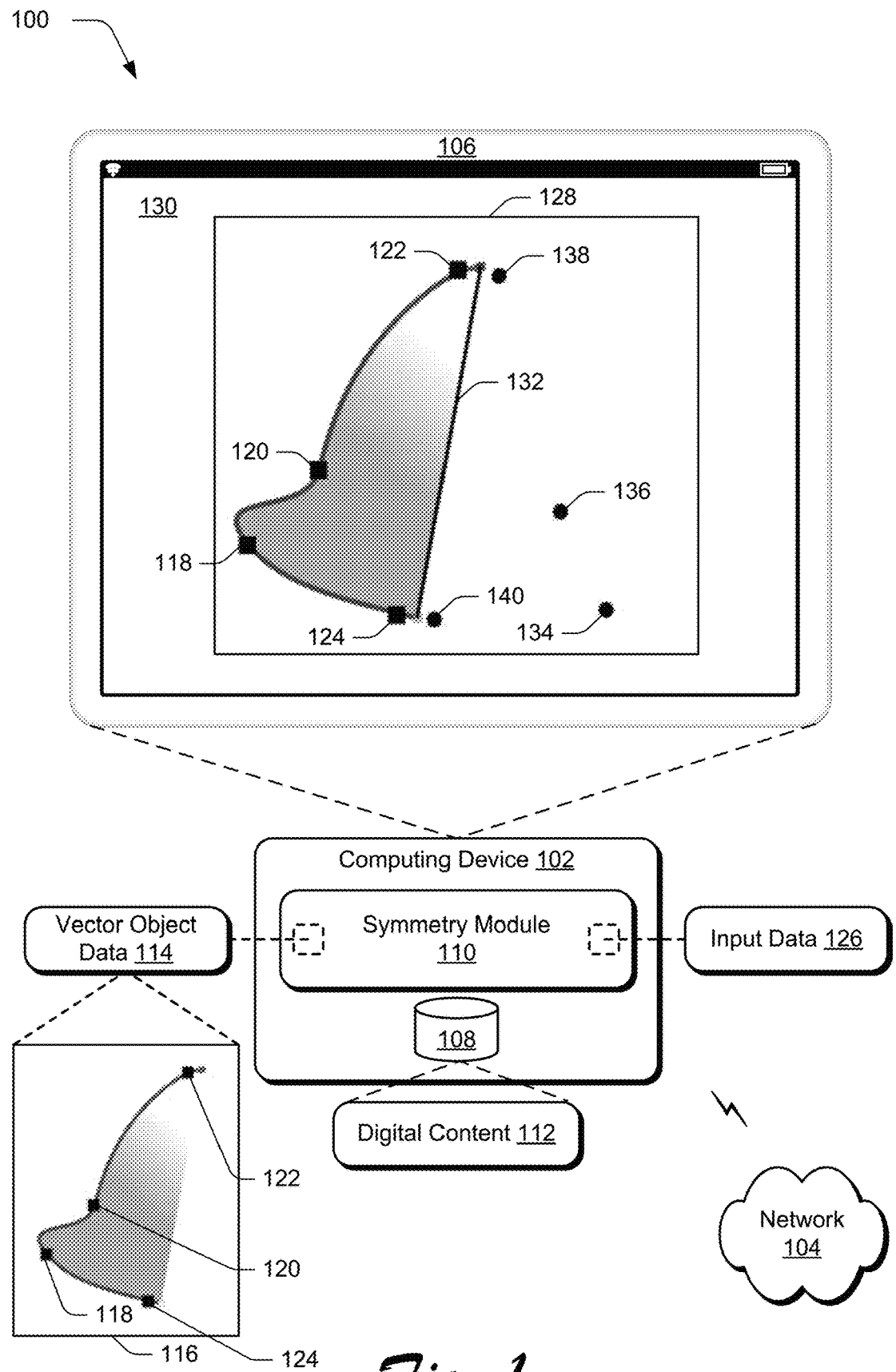
FIG. 1 is an illustration of an environment in an example implementation that is operable to employ digital systems and techniques for generating candidate mirror snap points using determined axes of symmetry as described herein.

Conventional mirror snapping systems are limited to identifying and suggesting candidate snap points based on pre-defined axes of symmetry such as a horizontal axis and/or a vertical axis. Because of this limitation, conventional systems are of limited value for editing vector objects which are partially asymmetric or oriented at an angle. In these scenarios, a vector object must be manually repositioned and/or reoriented multiple times to modify the vector object using the candidate snap points which is inefficient and prone to error. In order to overcome the limitations of conventional systems, techniques and systems are described for generating candidate mirror snap points using determined axes of symmetry.

In one example, a computing device implements a symmetry system to receive vector object data describing a set of points of a vector object. The symmetry system generates convex polygons (e.g., rectangles) that enclose the set of points. Each of the convex polygons has an area and the symmetry system identifies a particular convex polygon that has a smallest area. In this example, the particular convex polygon is a convex hull of the set of points of the vector object.

The symmetry system determines an axis of symmetry for the vector object as a side of the particular convex polygon. For example, the side is a longest side of the particular convex polygon. In one example, the side is a nearest side of the particular convex polygon to a most recent indication of a user interaction. In an example in which the particular convex polygon is a rectangle, the symmetry system determines the axis of symmetry as one of the two longest sides of the rectangle.

The symmetry system uses the axis of symmetry and the points of the vector object to generate reflected points. For example, each of the points is an anchor point and includes corresponding control points. In this example, the symmetry system reflects each of the points and corresponding control points about the axis of symmetry. To do so, the symmetry system generates an affine transformation matrix based on a y-axis intercept of the axis of symmetry and an angle between the axis of symmetry and an x-axis.

The symmetry system applies the affine transformation matrix on each of the points and corresponding control points to generate the reflected points and reflected control points. In one example, instead of reflecting the points and corresponding control points independently, the symmetry system reflects Bezier segments including the points and corresponding control points. For example, symmetry system tracks associations of points and control points and associations of reflected points and reflected control points using metadata associated with the vector object.

Consider an example in which the symmetry system leverages the reflected points to generate indications of candidate mirror snap points for editing the vector object. In this example, the symmetry system generates an indication of a candidate snap point for each of the reflected points. In one example, the symmetry system renders the indications of the candidate snap points relative to the vector object in a user interface of a display device.

A user interacts with an input device (e.g., a mouse, a stylus, a microphone, a keyboard, etc.) relative to the user interface to generate input data that describes these interactions. For example, the user interacts with the input device to select an indication of a candidate snap point and the symmetry system receives input data describing the selected indication. Responsive to receiving the input data, the symmetry system accesses the metadata associated with the vector object and uses the metadata to render indications of reflected control points corresponding to the candidate snap point in the user interface.

In one example, the user interacts with the input device to modify the candidate snap point by interacting with the indications of the reflected control points. In another example, the user interacts with the input device to connect a Bezier segment to the candidate snap point. For example, the Bezier segment is added as part of a symmetric or asymmetric portion of the vector object. In this example, the Bezier segment is part of a symmetric portion of the vector object and the symmetry system receives input data describing this interaction and renders the symmetric portion of the vector object in the user interface.

After connecting the Bezier segment to the candidate snap point, the user interacts with the input device to interact with an indication of an additional candidate snap point. For example, there are sequential indications of candidate snap points disposed between the additional candidate snap point and the candidate snap point. The symmetry system receives input data describing a selection of the additional candidate snap point and the candidate snap points disposed between the additional candidate snap point and the candidate snap point. In response to receiving this input data, the symmetry system autocompletes another symmetric portion of the vector object using the candidate snap points that are disposed between the additional candidate snap point and the candidate snap point.

Unlike conventional systems which are limited to predefined horizontal and vertical axes of symmetry, the described systems are capable of automatically determining an axis of symmetry based on the set of points of the vector object. The described systems are even capable of determining different axes of symmetry as the user interacts with the input device to modify the vector object. The described systems improve mirror snapping technology further by autocompleting symmetric portions of the vector object which increases efficiency of digital content creation relative to the conventional systems which are prone to error and inefficient.

Term Examples

As used herein, the term "convex polygon" refers to a polygon having interior angles which are all less than 180 degrees. By way of example, vertices of a convex polygon point outward or away from a center of the convex polygon.

As used herein, the term "snap point" refers to a point defined in a user interface which relocates a cursor or a portion of a digital object that is within a threshold proximity of the point to collocate the cursor or the portion of the digital object with the point.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and symmetry module 110. The storage device 108 is illustrated to include digital content 112.

The symmetry module 110 is shown as having, receiving, and/or transmitting vector object data 114. For example, the vector object data 114 describes sets of points of vector objects. In the illustrated example, the vector object data 114 describes a vector object 116 which includes a set of points 118-124. In an example, the points 118-124 are anchor points of the vector object 116.

The symmetry module 110 is also illustrated as having, receiving, and/or transmitting input data 126. In one example, the input data 126 describes user inputs. In this example, a user interacts with an input device (e.g., a mouse, a keyboard, a stylus, a microphone, etc.) and the input device communicates the input data 126 to the computing device 102, for example, via the network 104. The input data 126 describes the user's interactions with the input device.

In an example, the user interacts with the input device and an application for creating and/or editing digital content to create and/or edit the vector object 116. For example, the user interacts with the input device to modify control points of the points 118-124. The symmetry module 110 receives the input data 126 describing the modification of the control points of the points 118-124 and processes the input data 126 to render the vector object 116.

In another example, the symmetry module 110 processes the vector object data 114 to generate candidate mirror snap points 128 which are displayed in a user interface 130 of the display device 106. To do so in one example, the symmetry module 110 generates convex polygons that enclose the points 118-124. The symmetry module 110 then identifies a particular convex polygon that has a smallest area of the convex polygons. Accordingly, the convex polygons each have an area and the particular convex polygon has the smallest area. In an example, the particular convex polygon is a convex hull of the points 118-124.

Once the particular convex polygon is identified, the symmetry module 110 selects a side of the particular convex polygon and determines an axis of symmetry 132 as the side of the particular convex polygon. For example, the symmetry module 110 selects the side as being a longest side of the particular convex polygon. In this example, the longest side of the particular convex polygon corresponds to a directional flow of a visual appearance of the vector object 116. In another example, the symmetry module 110 selects the side as being a nearest side of the particular convex polygon to a most recent indication of a user interaction as described by the input data 126.

As shown, the vector object 116 includes three curve segments such that no portion of the vector object 116 aligns well with a horizontal axis (e.g., an x-axis) or a vertical axis (e.g., a y-axis). The axis of symmetry 132 is not parallel to the horizontal axis or the vertical axis in this example. Rather, the axis of symmetry 132 intercepts the horizontal axis and the vertical axis such that the axis of symmetry 132 appears to follow a direction of a shape of the vector object 116.

The symmetry module 110 leverages the axis of symmetry 132 and the points 118-124 to generate indications 134-140 of candidate snap points. For example, the symmetry module 110 generates indication 134 by reflecting point 118 about the axis of symmetry 132. This includes applying an affine transformation on coordinates of the point 118 based on y-axis intercept of the axis of symmetry 132 and an angle between the axis of symmetry 132 and an x-axis in one example.

As shown, the symmetry module 110 generates indication 136 by reflecting point 120 about the axis of symmetry 132; the symmetry module 110 generates indication 138 by reflecting point 122 about the axis of symmetry 132; and the symmetry module 110 generates indication 140 by reflecting point 124 about the axis of symmetry 132. For example, the user interacts with the input device to generate input data 126 that describes interactions with the indications 134-140. In this example, the indications 134-140 are usable to produce a mirror of the vector object 116 such that the mirror and the vector object 116 are a single vector object that is symmetric about the axis of symmetry 132. In another example, the indications 134-140 are usable to produce a partial mirror of the vector object 116 such that the partial mirror and the vector object 116 are a single vector object which is not symmetric about the axis of symmetry 132.

For example, the user interacts with the input device to interact with the indication 138 and modifies a position of the indication 138 to produce a non-symmetric portion of a single vector object. In another example, the user interacts with the input device to select the indication 138 and the symmetry module 110 receives input data 126 describing the selection of the indication 138. For example, the symmetry module 110 processes the input data to generate indications of control points of the indication 138. In one example, the symmetry module 110 generates the indications of the control points of the indication 138 by reflecting control points of the point 122 about the axis of symmetry 132.

Continuing the example in which the user selects the indication 138, the user then interacts with the input device to generate input data 126 describing an interaction with the indication 140. In this example, the input data 126 does not describe an interaction with indications 134, 136. For example, the indications 134, 136 are sequential indications disposed between the indication 138 and the indication 140. The symmetry module 110 receives the input data 126 and processes the input data 126 to autocomplete a symmetric portion of the single vector object. For example, the symmetry module 110 autocompletes the symmetric portion using the indication 136 and the indication 134.

Figure 2:
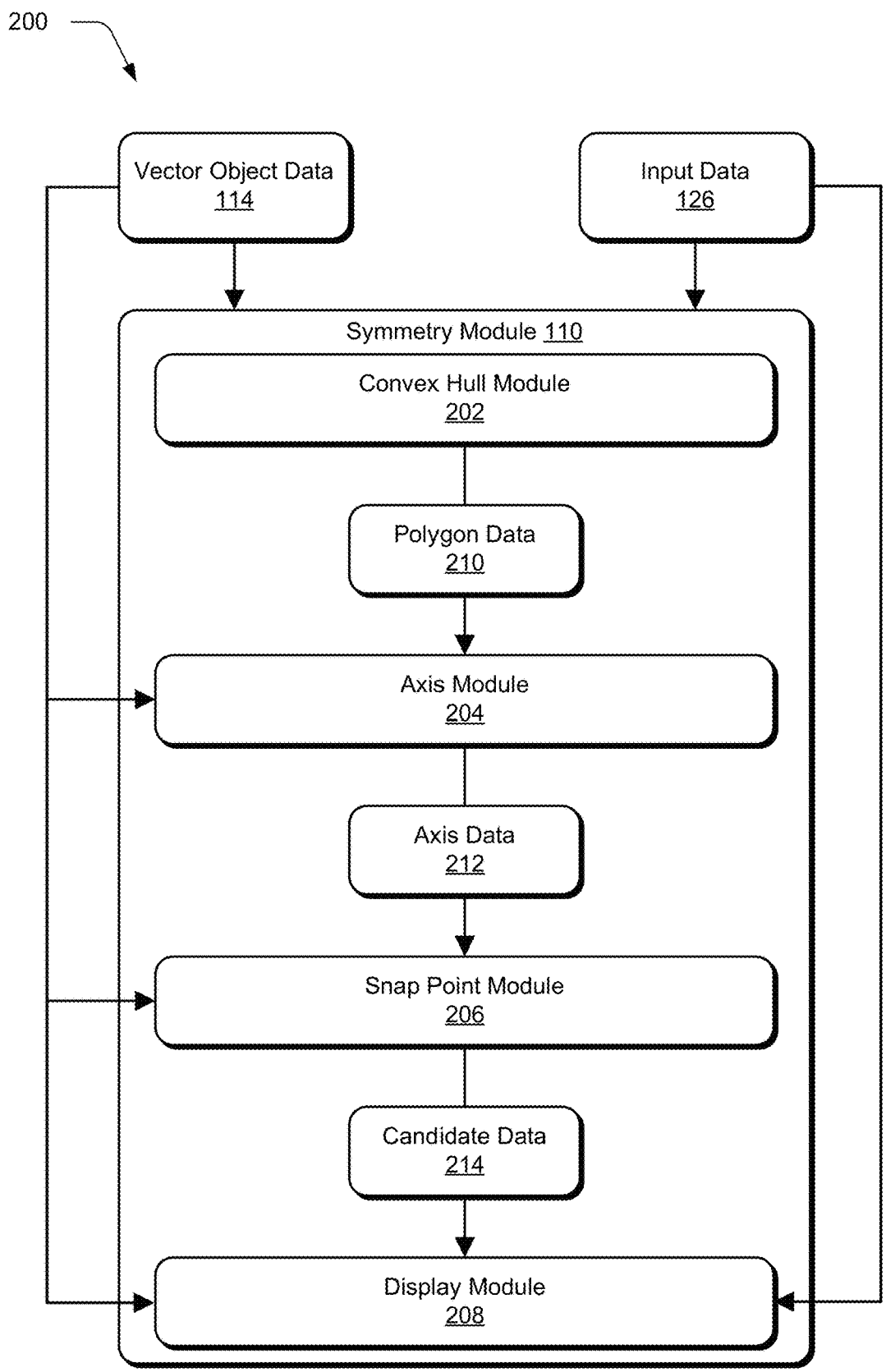
FIG. 2 depicts a system in an example implementation showing operation of a symmetry module for generating candidate mirror snap points using determined axes of symmetry.

FIG. 2 depicts a system 200 in an example implementation showing operation of a symmetry module 110. The symmetry module 110 is illustrated to include a convex hull module 202, an axis module 204, a snap point module 206, and a display module 208. In the illustrated example, the symmetry module 110 receives the vector object data 114 and the input data 126 as inputs. In other examples, the symmetry module 110 receives the input data 126 as an input and generates the vector object data 114 based on the input data 126. For example, the convex hull module 202 receives the vector object data 114 and processes the vector object data 114 to generate polygon data 210.

Figure 3A:
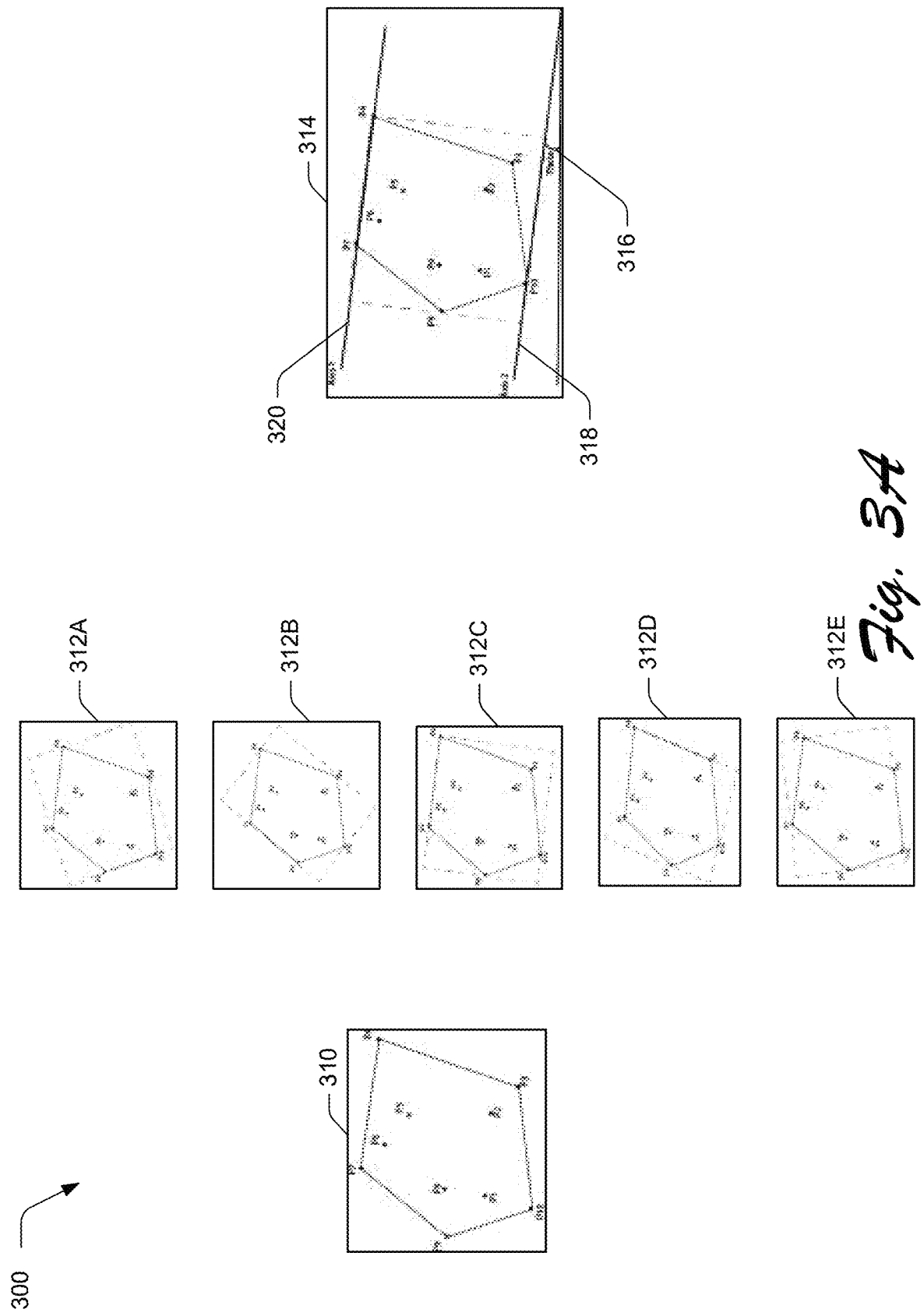
FIGS. 3A, 3B, 3C, 3D, and 3E illustrate an example of generating candidate mirror snap points using determined axes of symmetry.
Figure 3B:
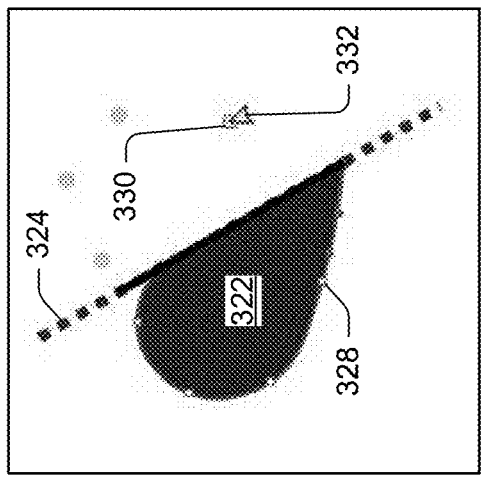
Figure 3B:
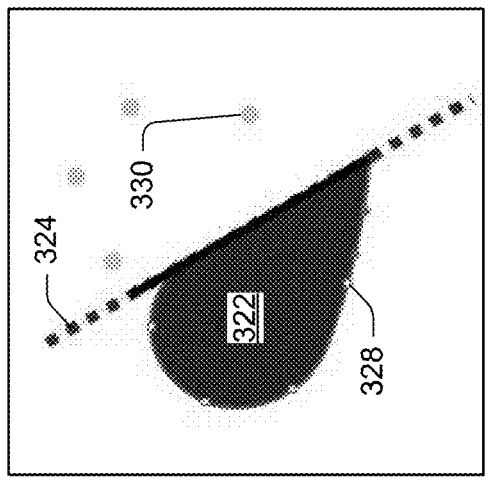
Figure 3B:
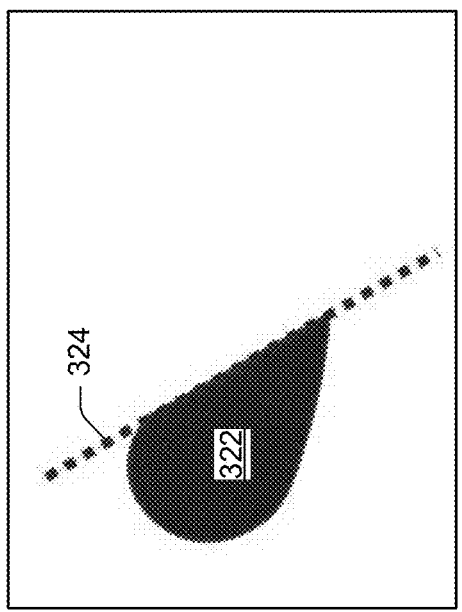
Figure 3C:
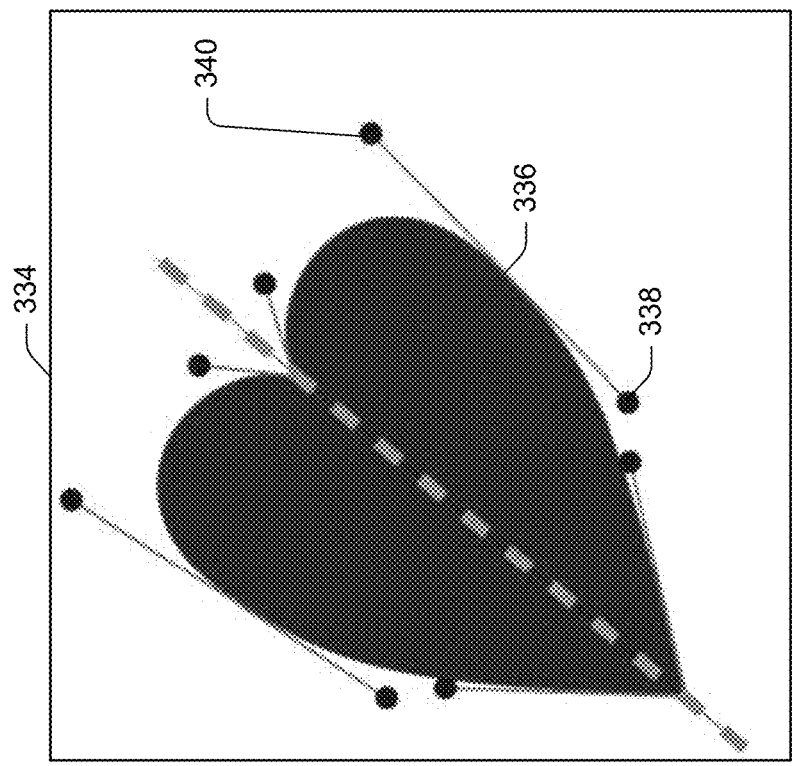
Figure 3D:
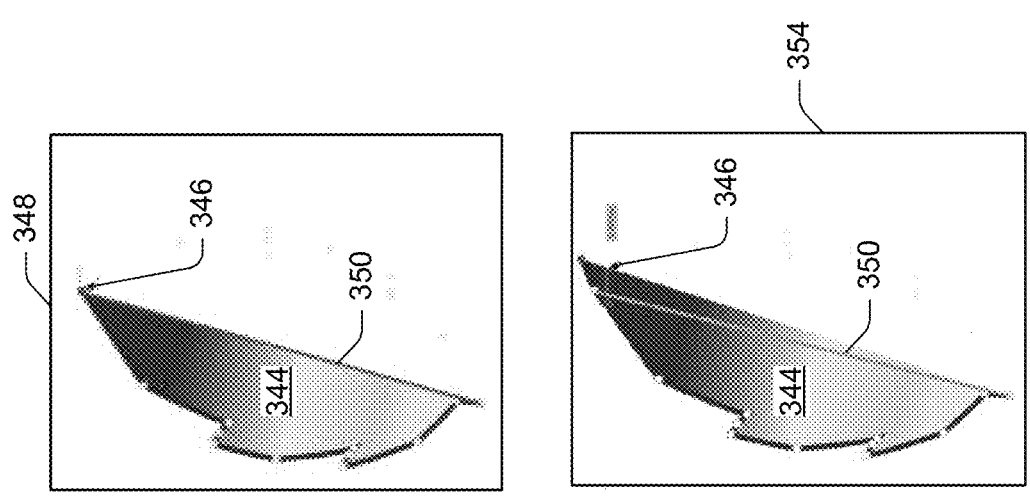
Figure 3D:
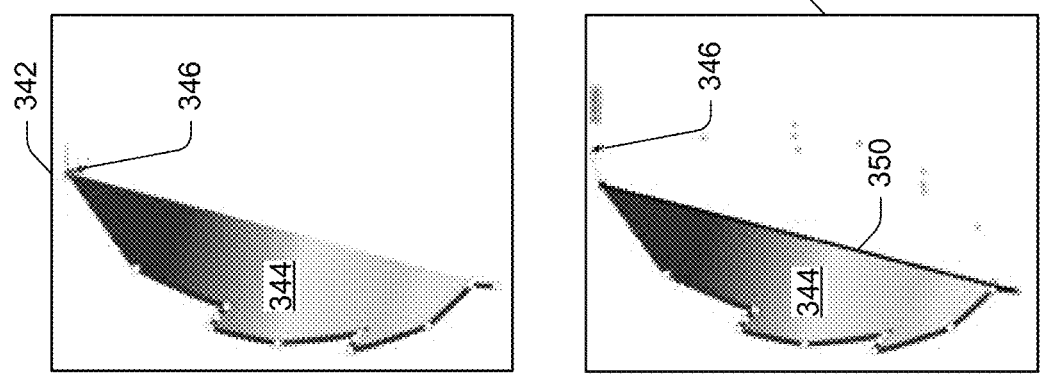
Figure 3E:
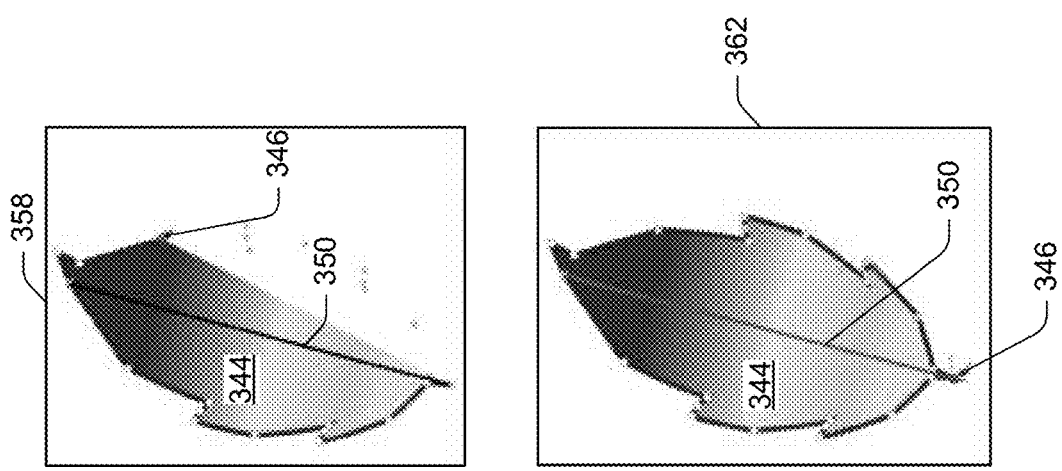
Figure 3E:
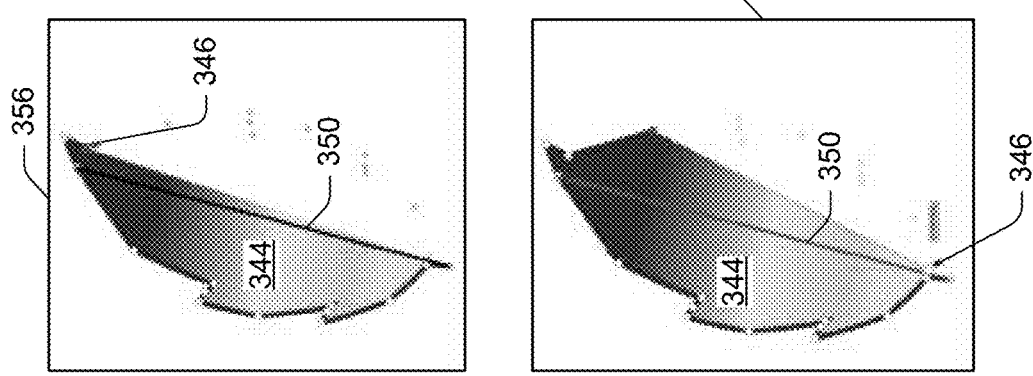

FIGS. 3A, 3B, 3C, 3D, and 3E illustrate an example of generating candidate mirror snap points using determined axes of symmetry. FIG. 3A illustrates a representation 300 of determining an axis of symmetry for a vector object. FIG. 3B illustrates a representation 302 of generating indications of candidate snap points. FIG. 3C illustrates a representation 304 of generating indications of control points for candidate snap points. FIG. 3D illustrates a representation 306 of producing an asymmetric portion of a single vector object. FIG. 3E illustrates a representation 308 of autocompleting a symmetric portion of the single vector object.

As shown in FIGS. 2 and 3A, the convex hull module 202 receives the vector object data 114 that describes a set of points of a vector object 310. In this example, the set of points P1-P10 define the vector object 310. The convex hull module 202 processes the vector object data 114 and determines convex polygons that enclose the points P1-P10. In one example, the convex hull module 202 determines rectangles that enclose the points P1-P10. To do so in an example, the convex hull module 202 identifies all edges of the vector object 310. In this example, the vector object 310 includes five edges which are defined by points (P10, P9); (P9, P7); (P7, P4); (P4, P3); and (P3, P10).

The convex hull module 202 defines a variable theta as an angle between each edge of the vector object 310 and an x-axis. For example, the convex hull module 202 computes theta as an angle between an edge defined by points (P10, P9) and the x-axis. As shown in representation 312A, the convex hull module 202 begins with the edge defined by points (P10, P9) and determines a smallest rectangle that encloses points P1-P10 and which has one side orientated at angle theta. The convex hull module 202 determines an area of this rectangle which the convex hull module 202 and/or the axis module 204 uses to identify a convex polygon that encloses points P1-P10 and has a smallest area. The convex hull module 202 then rotates the rectangle by theta which is depicted in representation 312B.

As illustrated in the representation 312B, the convex hull module 202 calculates an updated theta based on an edge of the vector object 310 defined by points (P9, P7). The convex hull module 202 then determines a smallest rectangle that encloses points P1-P10 and has one side oriented at the updated angle theta. For example, the convex hull module 202 determines an area of this rectangle and then rotates the rectangle by the updated angle theta.

Representation 312C illustrates the rotated rectangle. As shown, the convex hull module 202 calculates an updated theta based on an edge of the vector object 310 defined by points (P7, P4). For example, the convex hull module 202 determines a smallest rectangle that encloses points P1-P10 and has one side oriented at the updated angle theta. In this example, the convex hull module 202 computes an area of this rectangle and then rotates the rectangle by the updated angle theta.

As depicted in representation 312D, the convex hull module 202 determines an updated theta based on an edge of the vector object 310 defined by points (P4, P3). The convex hull module 202 determines a smallest rectangle that encloses points P1-P10 and has one side oriented at the updated angle theta. For example, the convex hull module 202 determines an area of this rectangle and then rotates the rectangle by the updated angle theta which is illustrated in representation 312E. As shown, the convex hull module 202 computes an updated theta based on an edge of the vector object 310 defined by points (P3, P10). The convex hull module 202 determines a smallest rectangle that encloses points P1-P10 and has one side oriented at the updated angle theta. The convex hull module 202 calculates an area of this rectangle.

The convex hull module 202 compares the areas of the rectangles illustrated in the representations 312A-312E and determines that the rectangle illustrated in the representation 312C has the smallest area. For example, the rectangle shown in the representation 312C has an area that is smaller than the areas of the rectangles depicted in the representations 312A, 312B, 312D, and 312E. Accordingly, the rectangle illustrated in the representation 312C is a convex hull of points P1-P10. The convex hull module 202 generates the polygon data 210 as describing the rectangle illustrated in the representation 312C. The axis module 204 receives the polygon data 210 and the vector object data 114 and processes the polygon data 210 and/or the vector object data 114 to generate axis data 212.

As shown in representation 314, the axis module 204 selects a side of a particular convex polygon (e.g., a side of the rectangle illustrated in the representation 312C) to define as an axis of symmetry for the vector object 310. In one example, the axis module 204 determines axis 318 as the axis of symmetry for the vector object 310. In this example, the axis module 202 selects a side of the rectangle that is closest to a most recent indication of a user interaction to be the axis of symmetry.

In another example, the axis module 204 determines axis 320 as the axis of symmetry for the vector object 310. In this example, the axis module 204 selects a side of the rectangle that is a longest side of the rectangle to be the axis of symmetry. For example, the axis module 204 selects a side of the rectangle that is longer than at least one additional side of the rectangle to be the axis of symmetry. In other examples, the axis module 204 selects a side of the rectangle which follows a direction of flow of a shape of the vector object 310 to be the axis of symmetry. The axis module 204 generates the axis data 212 as describing the selected side of the rectangle.

The snap point module 206 receives the axis data 212 and the vector object data 114 and processes the axis data 212 and/or the vector object data 114 to generate candidate data 214. As illustrated in FIG. 3B, the representation 302 includes a vector object 322 and an axis of symmetry 324. As shown, the vector object 322 is half of a heart shape which includes a straight portion that does not align with a horizontal axis (e.g., an x-axis) or a vertical axis (e.g., a y-axis). The axis of symmetry 324 is illustrated as following the straight portion of the vector object 322. For example, the vector object data 114 describes the vector object 322 and the axis data 212 describes the axis of symmetry 324. In one example, the axis data 212 describes a side of a convex polygon and the snap point module 206 generates the axis of symmetry 324 based on the side of the convex polygon.

The vector object 322 is defined by a set of points and this set of points is represented by point 328. For example, the snap point module 206 uses the point 328 and the axis of symmetry 324 to generate an indication 330 of a candidate snap point. To do so, the snap point module 206 represents the axis of symmetry 324 as a linear equation and determines a y-axis intercept for the axis of symmetry 324. The snap point module 206 also determines an angle between the axis of symmetry 324 and an x-axis which is defined as a theta angle. The snap point module 206 generates an identity matrix which the snap point module 206 uses to reflect the point 328 about the axis of symmetry 324 to generate the indication 330.

For example, the snap point module 206 generates a translated matrix by translating or shifting the identity matrix by an amount equal to a positive y-axis intercept of the axis of symmetry 324. The snap point module 206 then generates a transformed matrix by multiplying the identity matrix by the translated matrix. In one example, the snap point module 206 generates a rotated matrix by rotating the identity matrix by an amount equal to a negative theta for the axis of symmetry 324. In this example, the snap point module 206 updates the transformed matrix by multiplying the transformed matrix by the rotated matrix.

The snap point module 206 initializes a y-inverted matrix and updates the transformed matrix by multiplying the updated transformed matrix by the y-inverted matrix. For example, the snap point module 206 generates an additional rotated matrix by rotating the identity matrix by an amount equal to a positive theta for the axis of symmetry 324. The snap point module 206 updates the transformed matrix by multiplying the additional rotated matrix by the updated transformed matrix. In some examples, the snap point module 206 generates an additional translated matrix by translating or shifting the identity matrix by an amount equal to a negative y-intercept of the axis of symmetry 324. Finally, the snap point module 206 generates an affine transform matrix by multiplying the updated transformed matrix by the additional translated matrix.

For example, the snap point module 206 applies the affine transform matrix on coordinates of the point 328 to generate the indication 330 of the candidate snap point. In one example, the snap point module 206 also applies the affine transform matrix on coordinates of control points of the point 328. As shown, the user interacts with the input device via cursor 332 to interact with the indication 330 of the candidate snap point. For example, the indication 330 is a translucent hint and the user interacts with the input device to bring the cursor 332 within a threshold proximity of the indication 330. In the illustrated example, the symmetry module 110 snaps the cursor 332 to the indication 330 in response to receiving the input data 126 describing the cursor 332 within the threshold proximity of the indication 330.

In some examples, instead of reflecting the point 328 and its control points about the axis of symmetry 324 as independent entities, the snap point module 206 reflects the point 328 and its control points as a whole Bezier segment. For example, the snap point module 206 reflects all of the points of the vector object 322 as whole Bezier segments and generates the candidate data 214 as describing the reflected points of the vector object 322 represented by the point 328 and the reflected control points of the points of the vector object 322. In one example, the snap point module 206 writes data describing the reflected points of the vector object 322 and reflected control points of the points of the vector object 322 to metadata associated with the vector object 322. For example, the snap point module 206 writes data describing the indication 330 and its control points to the metadata associated with the vector object 322. The display module 208 receives the candidate data 214, the vector object data 114, and the input data 126 and processes the candidate data 214, the vector object data 114, and/or the input data 126 to render digital content 112. An example of this is illustrated in FIG. 3C.

As shown, the representation 304 includes a vector object 334 which has a point 336. The point 336 is included in a Bezier segment which is reflected from an additional Bezier segment of the vector object 334. For example, the display module 208 processes the candidate data 214 and the vector object data 114 to render the vector object 334. In one example, the display module 208 also generates indications 338, 340 of control points of the point 336. The indications 338, 340 indicate control points of the Bezier segment that includes the point 336 and the indications 338, 340 correspond to reflected control points of the additional Bezier segment of the vector object 334. In another example, the display module 208 does not render the indications 338, 340 of the control points until the user interacts with the input device to interact with the point 336.

For example, the user interacts with the input device to bring the cursor 332 within a threshold proximity of the point 336. The input data 126 describes coordinates of the point 336 and coordinates of the cursor 332 and the display module 208 computes a distance between the cursor 332 and the point 336 based on the coordinates. This computed distance is compared to a threshold distance to determine whether the user has interacted with the input device to bring the cursor 332 within the threshold proximity of the point 336. Responsive to receiving input data 126 describing the interaction with the point 336, the display module 206 renders the indications 338, 340 of the control points of the point 336. In this example, as the user interacts with the input device to bring the cursor 332 within the threshold proximity of the point 336, the display module 208 snaps to the point 336 and renders the indications 338, 340 of the control points of the point 336. The indications 338, 340 of the control points are usable to modify a curvature of a portion of the vector object 334.

As shown in FIG. 3D, the display module 208 receives the vector object data 114, the candidate data 214, and the input data 126 and processes the object data 114, the candidate data 214, and/or the input data 126 to render representation 342. The representation 342 includes a vector object 344 defined by a set of points and the user interacts with the input device to manipulate a cursor 346 in a user interface. For example, the user interacts with the input device and generates input data 126 describing a request for candidate mirror snap points for the vector object 344. The display module 208 receives the input data 126 and processes the input data 126 to render representation 348.

The representation 348 includes an axis of symmetry 350 and indications of candidate snap points. In an example, the symmetry module 110 generates convex polygons that enclose the set of points of the vector object 344. The symmetry module 110 determines a particular convex polygon that encloses the set of points and has a smallest area. In this example, the particular convex polygon is a convex hull of the set of points of the vector object 344. The symmetry module determines the axis of symmetry 350 as a side of the particular convex polygon.

For example, the display module 208 renders the indications of the candidate snap points based on the candidate data 214. The user interacts with the input device to generate input data 126 describing a non-symmetric addition to the vector object 344. In an example, the input data 126 describes a manipulation of an indication of a candidate snap point as part of an asymmetric portion added to or removed from the vector object 344. The display module 208 renders representation 352 as the user interacts with the input device to manipulate the cursor 346 to add the non-symmetric addition and the display module 208 renders representation 354 which includes a portion of the non-symmetric addition. For example, the representation 354 depicts the vector object 344 which is asymmetric about the axis of symmetry 350 after the non-symmetric addition.

With respect to FIG. 3E, the user interacts with the input device and manipulates the cursor 346 to complete the non-symmetric addition to the vector object 344 as shown in representation 356. The vector object 344 resembles a leaf and the non-symmetric addition is an asymmetric tip of the leaf. After completing the non-symmetric addition to the vector object 344, the user further interacts with the input device to generate input data 126 describing a manipulation of the cursor 346 in the user interface. For example, the display module 208 receives input data 126 describing an interaction with an indication of a candidate snap point which is located just below the non-symmetric addition. The display module 208 renders representation 358 in response to receiving and processing the input data 126. As illustrated, the user has added a symmetric portion to the vector object 344.

The user then interacts with the input device and causes the cursor 346 to interact with an additional indication of a candidate snap point which is located near a stem of the leaf depicted as the vector object 344. In this example, the user does not interact with indications of candidate snap points disposed between the additional indication and the indication which is located just below the non-symmetric addition. This generates input data 126 and the display module 208 receives the input data 126 and renders representation 360 before the cursor 346 interacts with the additional indication of the candidate snap point. The display module 208 renders representation 362 after the user interacts with the additional indication of the candidate snap point.

As illustrated in the representation 362, the display module 208 renders an autocompleted symmetric portion for the vector object 344 which is now included as part of the vector object 344. In an example, the display module 208 renders the autocompleted symmetric portion for the vector object automatically and without user interaction. For example, by not interacting with the indications of the candidate snap points disposed between the additional indication and the indication, the user generated input data 126 describing a request to autocomplete the symmetric portion defined by the candidate snap points between the additional indication and the indication. Although in this example there are multiple indications of candidate snap points disposed between the additional indication and the indication, not interacting with a single indication of a candidate snap point disposed between the additional indication and the indication generates input data 126 describing a request to autocomplete a symmetric portion defined by the single indication of the candidate snap point in other examples.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
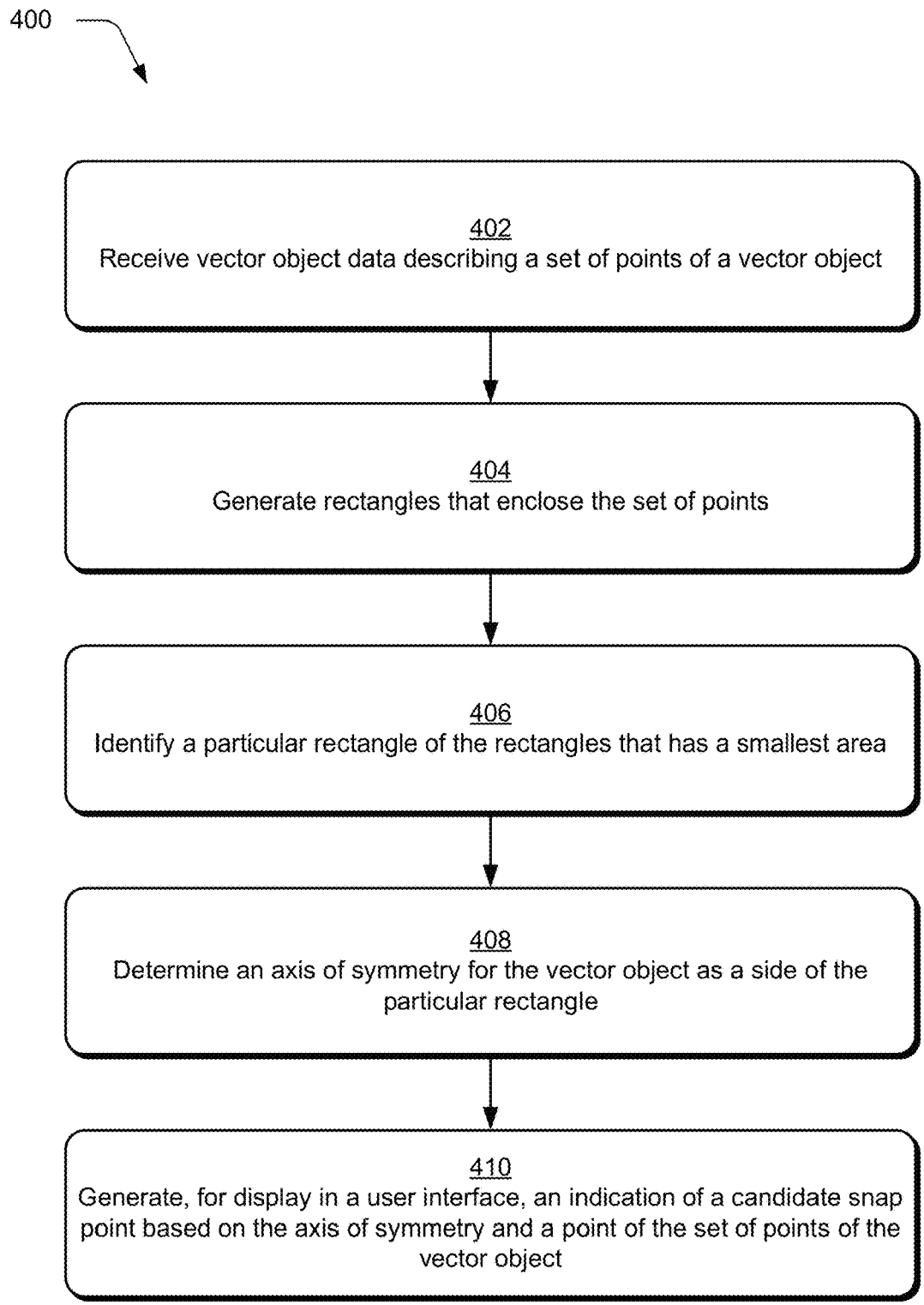
FIG. 4 is a flow diagram depicting a procedure in an example implementation in which vector object data describing a set of points of a vector object is received and an indication of a candidate snap point is generated based on an axis of symmetry determined for the vector object.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which vector object data describing a set of points of a vector object is received and an indication of a candidate snap point is generated based on an axis of symmetry determined for the vector object.

Vector object data describing a set of points of a vector object is received (block 402). The computing device 102 implements the symmetry module 110 to receive the vector object data in one example. Rectangles are generated that enclose the set of points (block 404). For example, the symmetry module 110 generates the rectangles that enclose the set of points. A particular rectangle of the rectangles that has a smallest area is identified (block 406). In one example, the symmetry module 110 identifies the particular rectangle.

An axis of symmetry for the vector object is determined as a side of the particular rectangle (block 408). For example, the computing device 102 implements the symmetry module 110 to determine the axis of symmetry for the vector object. An indication of a candidate snap point is generated for display in a user interface based on the axis of symmetry and a point of the set of points of the vector object (block 410). In an example, the symmetry module 110 generates the indication of the candidate snap point.

Figure 5:
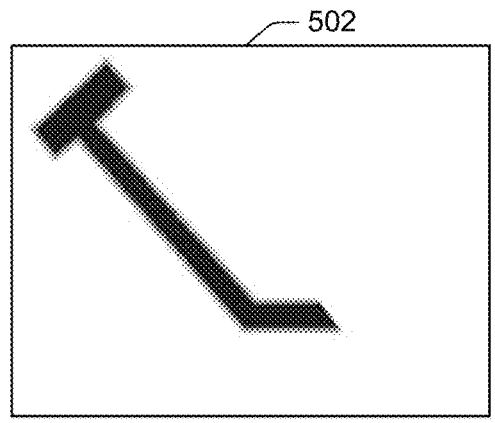
FIG. 5 illustrates a representation of example asymmetrical objects generated using candidate mirror snap points.
Figure 5:
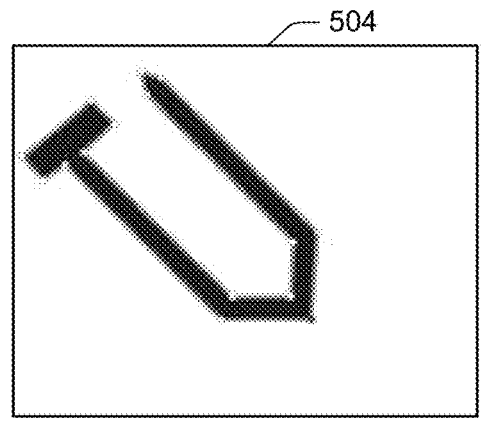
Figure 5:
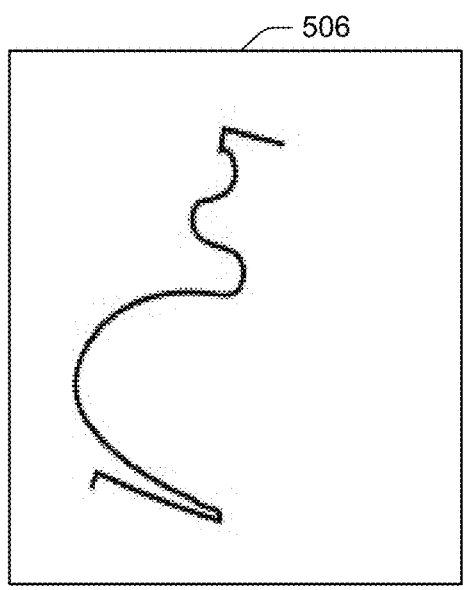
Figure 5:
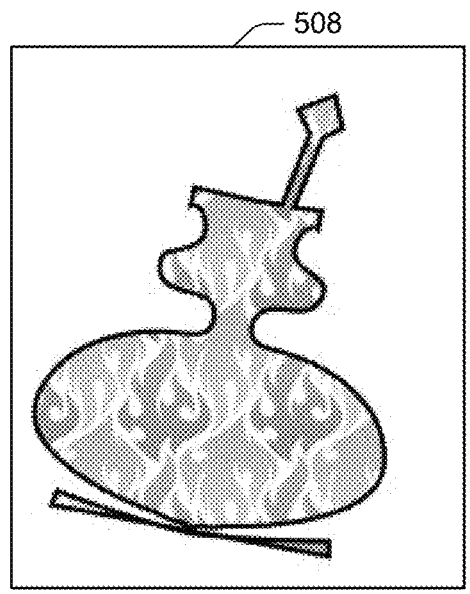

FIG. 5 illustrates a representation 500 of example asymmetrical objects generated using candidate mirror snap points. The representation 500 includes a first vector object 502 which resembles a capital "T" oriented at an angle and includes an artifact extending from its base. For example, the user interacts with the input device to modify the first vector object 502 using an axis of symmetry and indications of candidate snap points. This is illustrated as a first asymmetrical vector object 504. For example, the first asymmetrical vector object 504 does not include a portion of the first vector object 502 on one side of the axis of symmetry but is otherwise symmetric.

The representation 500 also includes a second vector object 506 which is a continuous open series of line and curve segments. In one example, the user interacts with the input device to modify the second vector object 506 using an axis of symmetry and indications of candidate snap points. In this example, a second asymmetrical vector object 508 is produced. Unlike the previous example in which the first asymmetrical vector object 504 does not include a portion of the first vector object 502 on the one side of the axis of symmetry, the second asymmetrical vector object 508 includes an added portion on one side of the axis of symmetry. As shown, the second asymmetrical vector object 508 resembles a decorative bowl or vase and the added portion appears to be a tool for manipulating or stirring something disposed in the bowl or vase. The second asymmetrical vector object 508 is symmetric except for the added portion.

Figure 6:
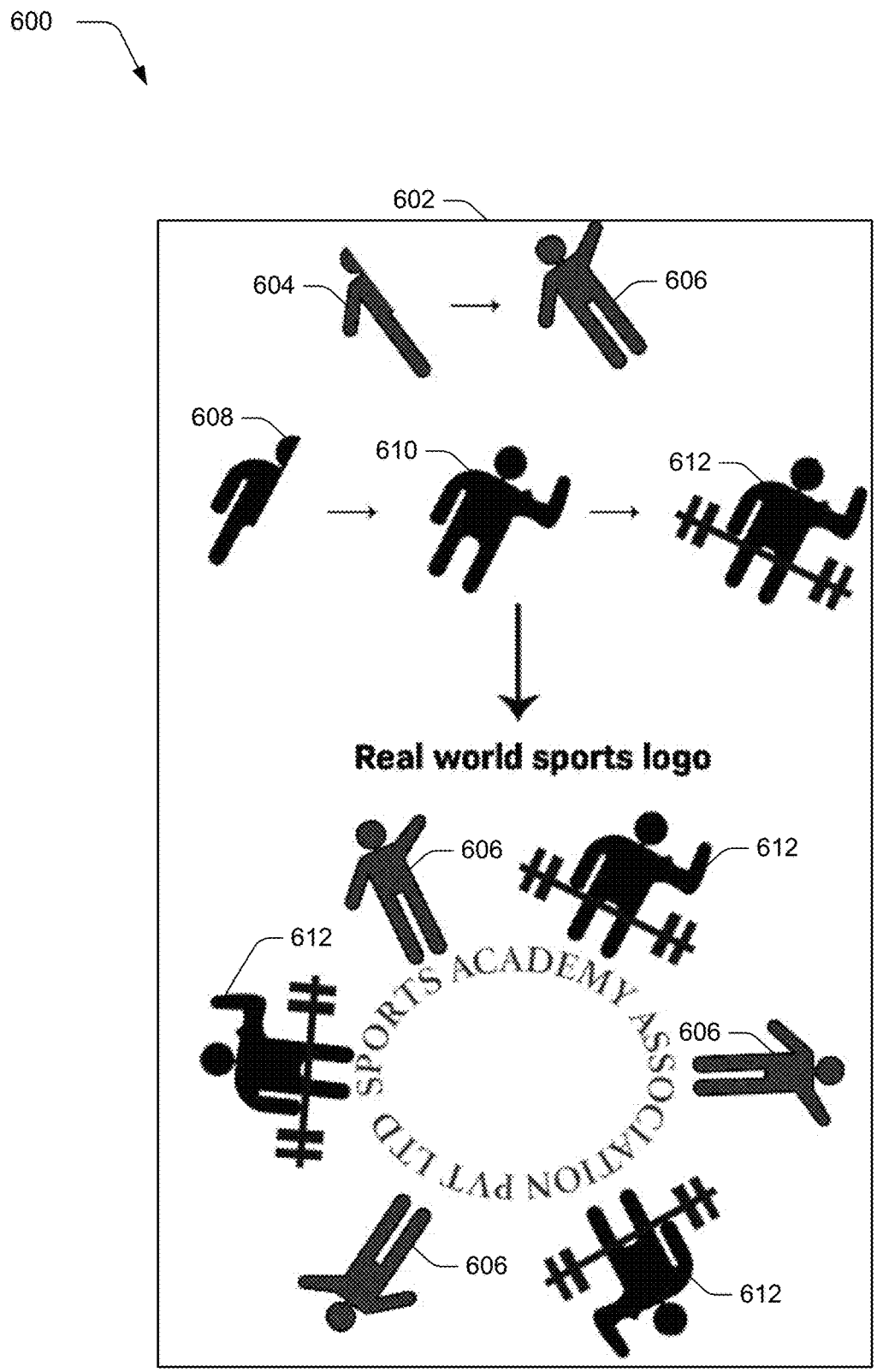
FIG. 6 illustrates a representation of digital content generated using candidate mirror snap points.

FIG. 6 illustrates a representation 600 of digital content generated using candidate mirror snap points. The representation 600 includes an example of digital content 602 which is a sports academy association poster. A vector object 604 is modified using an axis of symmetry and indications of candidate snap points. For example, the user interacts with the input device to produce an asymmetric vector object 606 which is an outline of a person with one hand raised and the other hand extending outward from its waist. An additional vector object 608 is also modified using an axis of symmetry and indications of candidate snap points. In one example, the user interacts with the input device to produce an additional asymmetric vector object 610 which is an outline of a person flexing a biceps muscle of one arm and having the other arm near its torso. In the illustrated example, the user further interacts with the input device to produce a complete vector object 612 by adding a barbell to a hand of the arm near the torso of the additional asymmetric vector object 610. As shown, the asymmetric vector object 606 and the complete vector object 612 are arranged around text to complete the digital content 602.

Example System and Device

Figure 7:
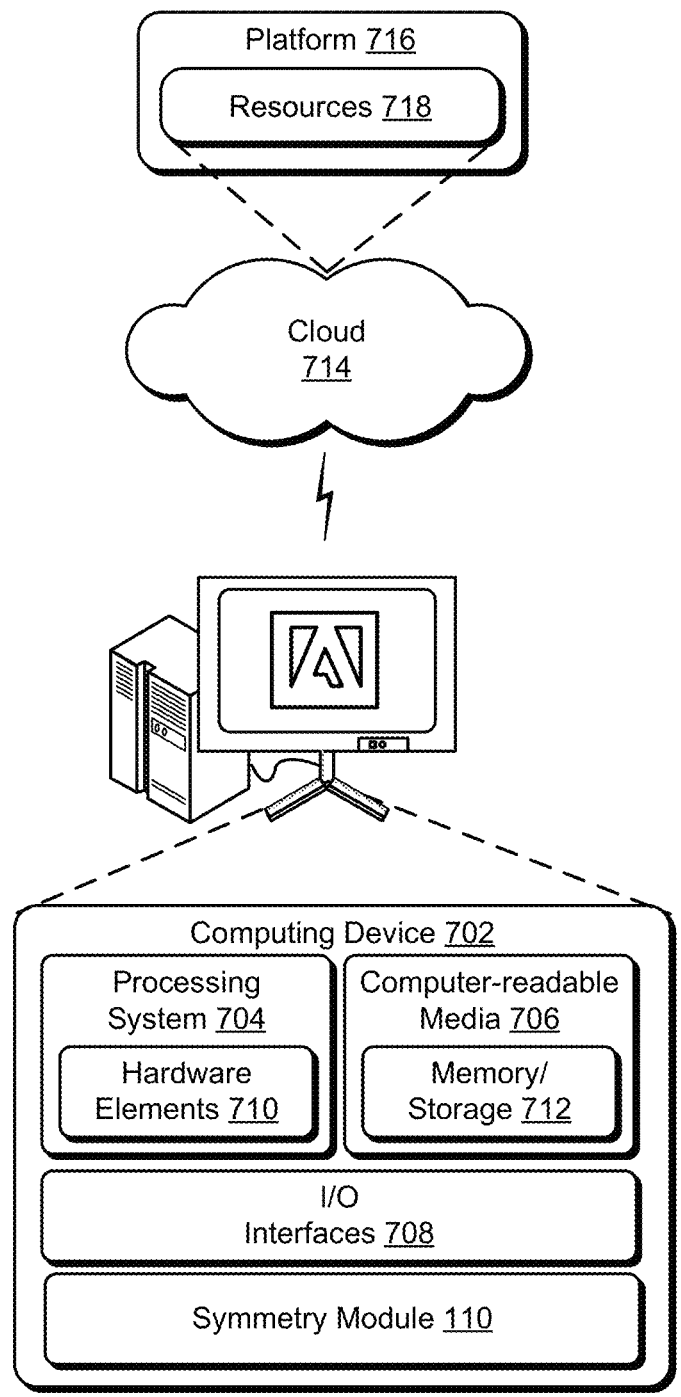
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the symmetry module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

Conclusion

Although implementations of systems for generating candidate mirror snap points using determined axes of symmetry have been described in language specific to structural features and/or methods, it is to be understood that the appended claims are not necessarily limited to the specific features or methods described. Rather, the specific features and methods are disclosed as example implementations of systems for generating mirror snap points using determined axes of symmetry, and other equivalent features and methods are intended to be within the scope of the appended claims. Further, various different examples are described and it is to be appreciated that each described example is implementable independently or in connection with one or more other described examples.

What is claimed is:

1. A method comprising:
computing, by a processing device, a convex hull enclosing a set of points of a vector object, the convex hull being a convex polygon;
determining, by the processing device, a linear axis of symmetry for the vector object as a side of the convex hull; and
generating, by the processing device, an indication of a candidate snap point based on the linear axis of symmetry and a point of the set of points.

2. The method as described in claim 1, wherein the convex hull is a rectangle.

3. The method as described in claim 1, further comprising receiving input data describing a manipulation of the indication of the candidate snap point as part of an asymmetric portion added to or removed from the vector object.

4. The method as described in claim 1, further comprising:
receiving input data describing a selection of the indication of the candidate snap point; and
generating indications of control points for the candidate snap point based on the linear axis of symmetry.

5. The method as described in claim 1, wherein the indication of the candidate snap point is generated by reflecting the point relative to the linear axis of symmetry.

6. The method as described in claim 5, wherein the point is reflected relative to the linear axis of symmetry by applying an affine transformation on coordinates of the point and corresponding control points based on a y-axis intercept of the linear axis of symmetry and an angle between the linear axis of symmetry and an x-axis.

7. The method as described in claim 1, further comprising:
receiving input data describing a selection of the indication of the candidate snap point; and
generating indication of control points of a first Bezier segment that includes the candidate snap point based on the linear axis of symmetry and a second Bezier segment that includes that point.

8. The method as described in claim 7, wherein the indication of the control points of the first Bezier segment are generated by reflecting the second Bezier segment relative to the linear axis of symmetry.

9. The method as described in claim 1, wherein the vector object is asymmetric.

10. The method as described in claim 1, further comprising tracking associations of points and control points and associations of reflected points and reflected control points using metadata associated with the vector object.

11. The method as described in claim 1, further comprising autocompleting a symmetric portion of the vector object based at least partially on the candidate snap point.

12. The method as described in claim 1, wherein the side of the convex hull is a longest side of the convex hull.

13. A non-transitory computer-readable storage medium storing executable instructions, which upon execution by a processing device, cause the processing device to perform operations comprising:
computing a convex hull enclosing a set of points of a vector object, the convex hull being a convex polygon;
determining a linear axis of symmetry for the vector object as a side of the convex hull; and
generating an indication of a candidate snap point based on the linear axis of symmetry and a point of the set of points.

14. The non-transitory computer-readable storage medium as described in claim 13, wherein the side of the convex hull is a longest side of the convex hull.

15. The non-transitory computer-readable storage medium as described in claim 13, wherein the side of the convex hull is a nearest side of the convex hull to a most recent indication of a user interaction.

16. The non-transitory computer-readable storage medium as described in claim 13, wherein the vector object is asymmetric.

17. The non-transitory computer-readable storage medium as described in claim 13, wherein the convex hull is a rectangle.

18. A system comprising:
a memory component; and
a processing device coupled to the memory component, the processing device to perform operations comprising:
computing a convex hull enclosing a set of points of a vector object, the convex hull being a convex polygon;
determining a linear axis of symmetry for the vector object as a side of the convex hull; and generating an indication of a candidate snap point based on the linear axis of symmetry and a point of the set of points.

19. The system as described in claim 18, wherein the side of the convex hull is a longest side of the convex hull.

20. The system as described in claim 18, wherein the vector object is asymmetric.

\* \* \* \* \*